United States Patent [19]

Grzybowski et al.

[11] Patent Number: 4,518,308

[45] Date of Patent: May 21, 1985

[54] MANIPULATOR APPARATUS

[75] Inventors: Bohdan Grzybowski, Highland Park; Mark T. Horbal, Warrenville, both of Ill.

[73] Assignee: Acrobe Technology Inc., St. Petersburg, Fla.

[21] Appl. No.: 354,780

[22] Filed: Mar. 1, 1982

[51] Int. Cl.$^3$ ............................................. B66C 23/00
[52] U.S. Cl. ..................................... 414/735; 74/640; 364/193; 901/15; 901/24; 901/28
[58] Field of Search ....................... 414/4, 730, 735, 1, 414/736, 222; 364/478, 513, 190, 193; 74/640, 625; 318/685, 696; 901/15, 23, 24, 28, 48, 50, 9

[56] References Cited

U.S. PATENT DOCUMENTS

| | | | |
|---|---|---|---|
| 3,960,285 | 6/1976 | Gano | 414/718 |
| 4,096,766 | 6/1978 | Pardo et al. | 414/1 X |
| 4,178,632 | 12/1979 | Anthony | 414/4 X |
| 4,204,903 | 5/1980 | Alexander | 414/222 |
| 4,239,431 | 12/1980 | Davini | 414/1 |
| 4,258,622 | 3/1981 | Estrabaud et al. | 318/685 X |
| 4,277,731 | 7/1981 | Pongracz | 318/685 |
| 4,353,677 | 10/1982 | Susnjara et al. | 414/735 |
| 4,356,554 | 10/1982 | Susnjara et al. | 364/513 |
| 4,360,878 | 11/1982 | Waller | 364/191 X |
| 4,401,931 | 8/1983 | Kulterman et al. | 318/685 X |

OTHER PUBLICATIONS

"AC Stepping Motors for Incremental Control", Electronic Equipment News, vol. 12, No. 10, (Jan. 1971).

Primary Examiner—Robert J. Spar
Assistant Examiner—Donald W. Underwood
Attorney, Agent, or Firm—Balogh, Osann, Kramer, Dvorak, Genova & Traub

[57] ABSTRACT

A manipulator apparatus comprises an elongated member having a number of arm sections interconnected by rotary actuators and supported by a vertical member rotatably mounted on a console. The other end of the elongated member terminates in a terminal motion actuator adapted to support an article handling member. Each rotary actuator comprises a stepping motor coupled to a harmonic drive device, wherein control pulses fed into the stepping motor will initiate motion which is reduced by the harmonic drive device and then imparted to the respective arm section. The vertical member is similarly controlled. The terminal motion actuator comprises a stepping motor rotatably supported by a rotary actuator comprising a combination of a stepping motor and a harmonic drive device. The terminal motion actuator has mounting means for supporting article handling members. The vertical member is rotatably supported in such manner that free play is totally eliminated. A control arrangement comprises a computer having hardware and software and interconnected with a CRT screen and a control panel. The computer is connected by a cable to bus means which intercouple a plurality of axes controlling devices, modulator connector devices, and data input devices. The computer has an address system to control the operation of the devices which have respective addresses. Each axis controlling device includes a microstep indexer interconnecting the axis controlling device with a motor driver which is connected to a respective stepping motor. The modular connector devices are connected to a plurality of modules which are associated with a particular type of external equipment which cooperates with the operation of the manipulator apparatus.

10 Claims, 12 Drawing Figures

MANIPULATOR APPARATUS

BACKGROUND OF THE INVENTION

1. Field of the Invention

This invention is generally concerned with apparatus for handling materials and performing functions as controlled by a human operator, and more specifically, is concerned with an apparatus which will duplicate the actions and movements comparable to a human operator.

2. Description of Prior Art

Mechanical arms or members generally identified as manipulators or manipulator arms are very often used in particular applications wherein the environment would be too hostile or dangerous for a human to perform certain functions, for example, as in handling dangerous chemicals or highly radioactive nuclear materials. Mechanical arms have also been utilized for performing repetitive functions such as transporting an article from one position to another position during a manufacturing process. Essentially, the manipulator apparatus provides an extension of the human arm capability.

Most, if not all, of the known manipulator apparatus use mechanical elements for obtaining motions in the different sections of the manipulator arms. Essentially, these mechanical elements comprise an arrangement of gears which provide rotary motion at the different sections of the manipulator arm. Since it is rather impossible to eliminate totally backlash in the gears, the net result is that the extremity of the manipulator arm terminating in a hand or gripper, which is capable of holding an article, is not accurate enough for performing functions requiring extreme accuracy.

SUMMARY OF THE INVENTION

The present invention provides a manipulator apparatus having preferably a console supporting a vertical column containing a vertical shaft rotatably disposed with respect to the console and responsive to a rotary actuator. The shaft, in turn, supports a manipulator arm comprising an upper arm section and a lower arm section which terminates in an article handling member. One end of the upper arm section is rotatably supported from the shaft and is powered by a rotary actuator which moves the upper arm section in a vertical plane. The upper and the lower arm sections are rotatably coupled and powered by a rotary actuator which moves the lower arm section in a vertical plane. Similarly, the article handling member is powered by a rotary actuator which can move the article handling member in different planes. An arrangement is provided for controlling the operation of the manipulator apparatus, wherein a computer with associated hardware and software receives data input from an operator panel which is simultaneously displayed on a screen. The computer communicates informationally with a plurality of control devices and components which are responsible for the movement of the manipulator apparatus. The interconnection of the computer with the plurality of components and devices is simplified by using a bus connected through a cable to the computer. The bus also functions to simplify intercoupling of external equipment or machinery with the manipulator apparatus, so that the manipulator apparatus can participate in operational functions with external equipment.

The main object of the invention is to provide a manipulator apparatus which is very accurate in positioning the article handling member in response to control signals.

A further object of the invention is to provide rotary actuators which accurately respond to applied control signals.

A still further object of the invention is to utilize rotary actuators having a pair of co-acting components, wherein one of the components receives a control signal and effects movement in the second component which functions to reduce the output movement.

A still further object of the invention is concerned with the various mechanical arrangements of the rotary actuators to produce accurate movements.

Another object of the invention is to provide an arrangement for controlling the operation of the manipulator apparatus.

Still another object of the invention is to provide a control arrangement using a computer which controls various components and devices controlling the individual functions and motions of the members of the manipulator apparatus.

A still further object of the invention is to present a simplified manner of interconnecting a plurality of components and devices with the computer.

The foregoing and other advantages and features of the invention will become apparent from the following detailed description of an illustrative embodiment of the invention when taken in connection with the accompanying drawings.

BRIEF DESCRIPTION OF THE DRAWINGS

FIG. 11 shows a blank diagram of a control arrangement for controlling the manipulator apparatus.

DETAILED DESCRIPTION OF A PREFERRED EMBODIMENT OF THE INVENTION

Figure 1:
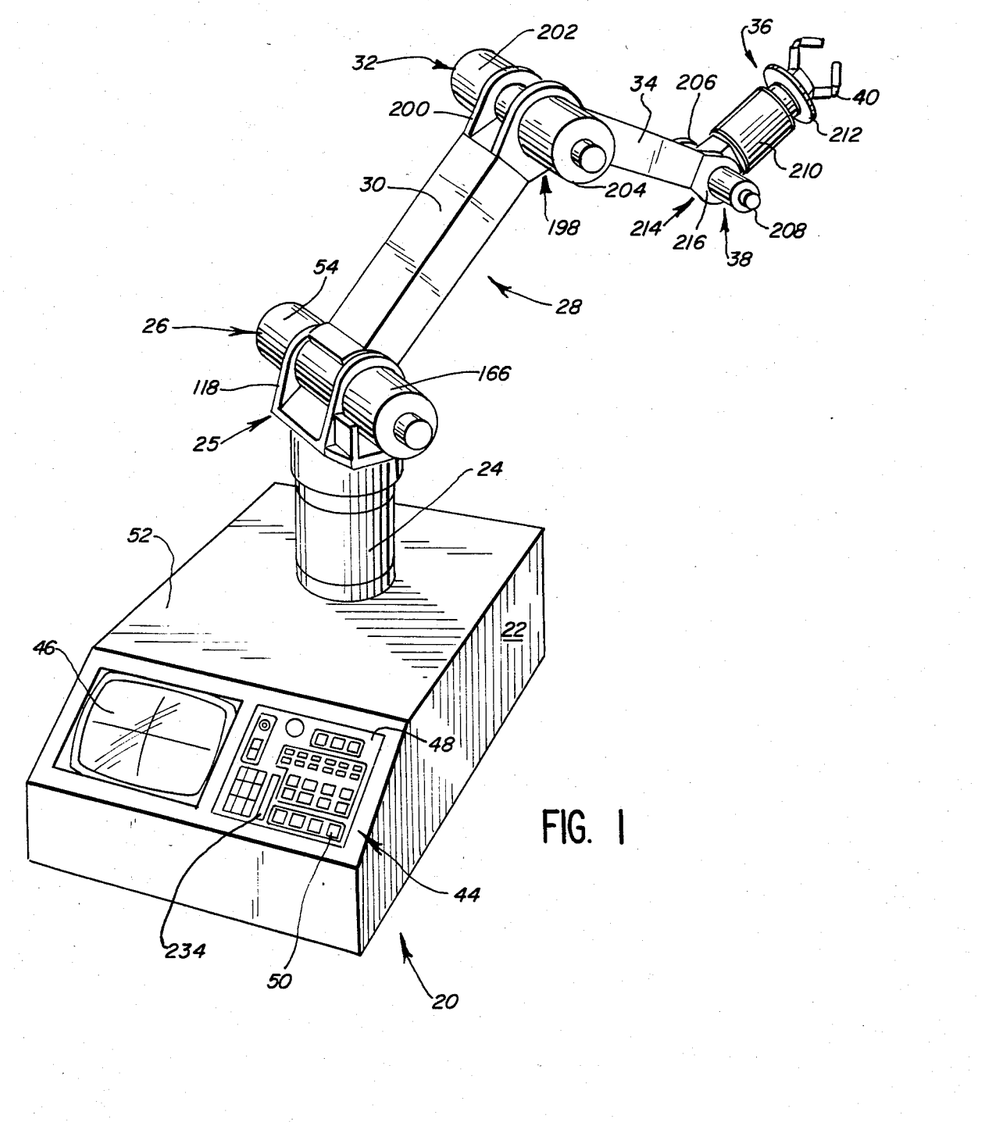
FIG. 1 is a perspective view of a manipulator apparatus.

The preferred embodiment of the invention is best viewed in FIG. 1, wherein a manipulator apparatus 20 comprises a console 22 supporting a vertical column 24 above which is mounted a trunnion assembly 25 which supports a rotary actuator 26 and a manipulator arm 28. The manipulator arm 28 has an upper arm section 30 terminating in a rotary actuator 32 and supporting a lower arm section 34 which, in turn, terminates in an article handling member 36. The article handling member 36 includes a motion actuator 38 and a gripper 40. As is apparent, the console 22 may be supported on a stationary or a movable support.

Figures 2, 3, 4:
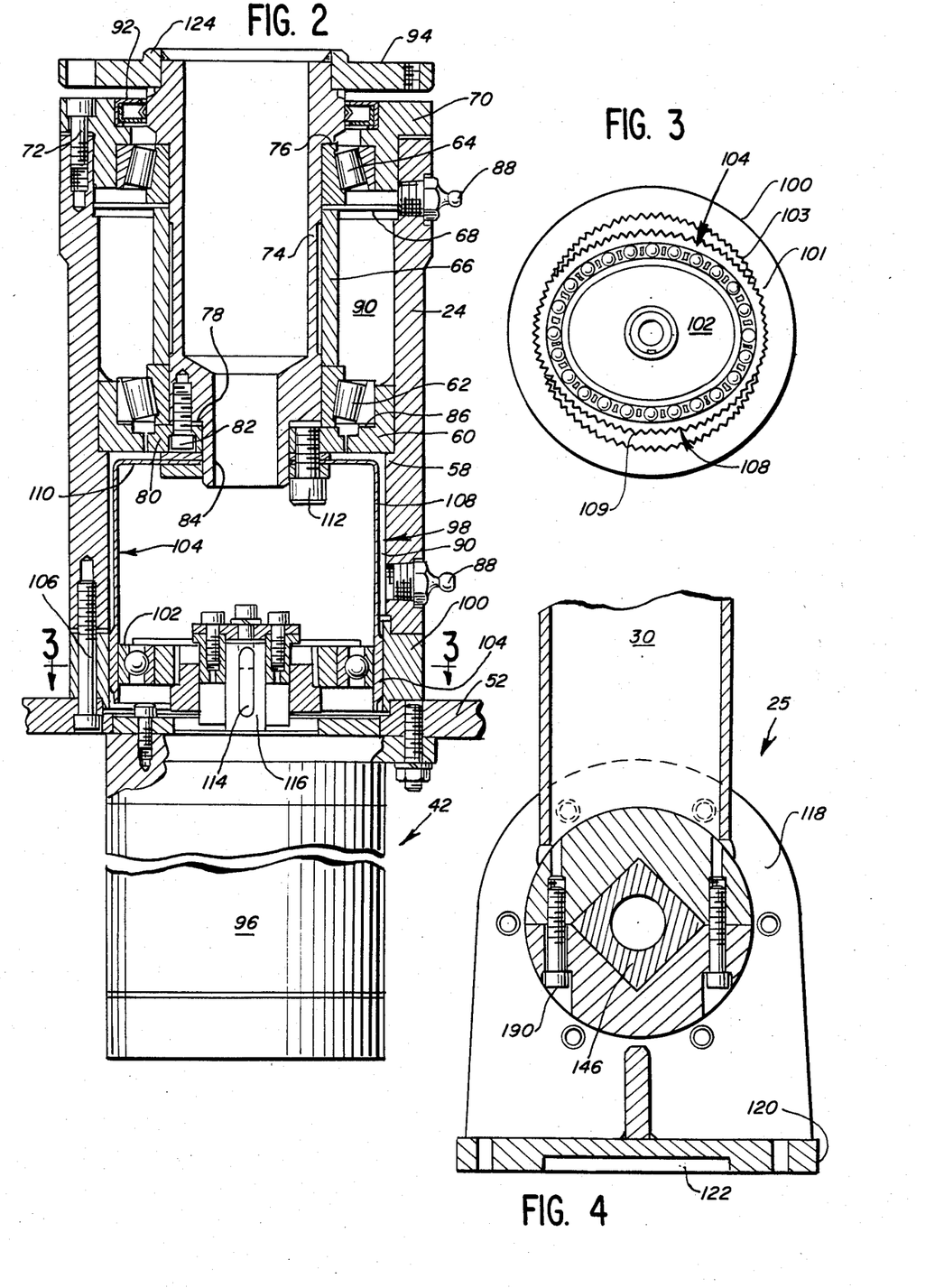
FIG. 2 is a sectional view through a portion of a console and a vertical column supporting a manipulator arm, as shown in FIG. 1.
FIG 3 is a sectional view of the vertical column along the line 3—3 in FIG. 2.
FIG. 4 is a sectional view of a trunnion assembly mounted at the top of the column and supporting the manipulator arm.
Figure 2:
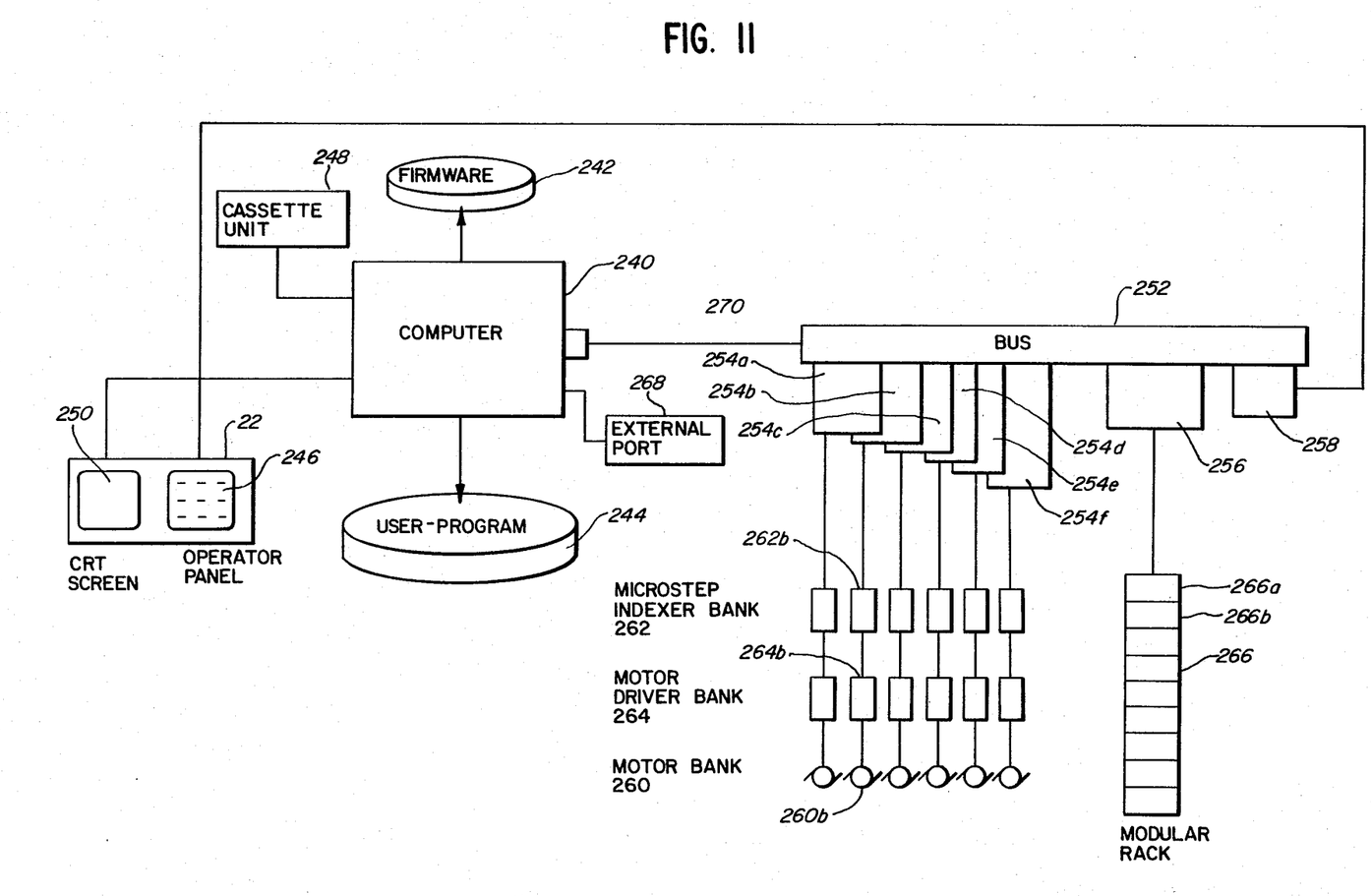

Referring to FIG. 2, the rotary movement of the trunnion assembly 25 is provided by a rotary actuator 42 which is effective to impart motion to the manipulator arm 28 in the horizontal plane. The various movements achieved with the manipulator apparatus have analogous relationship to the human body, wherein the movement of the trunnion assembly 25 can be identified with waist movement, the movement effected with the rotary actuator 26 would be associated with a shoulder, the movement effected by the rotary actuator 32 would be associated with an elbow movement. The function of the motion actuator 38 would be comparable to a wrist, and the performance associated with the gripper 40 would be identified with a hand.

The console 22 is provided with a control panel 44 having a video-digitizer display screen 46 and a data-input panel 48 having a plurality of push buttons 50.

Each rotary actuator, such as actuator 26, comprises a DC stepping motor coupled to a harmonic drive device. Both the stepping motor and the harmonic drive device are commercially available.

Referring to FIG. 2, the vertical column 24 is mounted on the top wall 52 of the console 22 and contains a drive arrangement so that the trunnion assembly 25 can be rotated in the horizontal plane.

The interior of the column 24 is provided with a shoulder 58 supporting a bearing collar 60 which, in turn, supports a tapered roller bearing 62. A roller bearing 64 is positioned in respect to the tapered roller bearing 62 by means of a sleeve 66 and a washer 68. The roller bearing 64 is maintained in place by a round bearing mounting member 70 which is secured to the column 24 by appropriate means as screws 72.

Passing through both of the bearings 62 and 64 and concentrically located with respect to the column 24, is a shaft 74 which has a shoulder 76 in abutment with the bearing 64. The shaft 74 is hollow and is provided with a shoulder 78 which is spaced from a mounting washer 80 by a small clearance determined by a distance ring or washer 86 interposed between the roller bearing 62 and the bearing collar 60. The mounting washer 80 is secured to the shoulder 78 by appropriate means such as screws 82. The shaft 74 is provided with a reduced section 84, which, as will be described later, is coupled to the rotary actuator 42.

In order to have flexibility in positioning the bearing 62 with respect to the bearing collar 60, the distance ring or washer 86 is positioned between the bearing 62 and the bearing collar 60, as previously mentioned. Both of the bearings 62, 64, as well as other movable elements in the column 24, are well lubricated by a lubricant introduced through nipples 88 into chambers 90. An oil seal 92 is located in the bearing mounting member 70 and abuts the shaft 74. Secured to the upper end of the shaft 74 is a platform 94 which, as will be described, is used to support the trunnion assembly 25. As was mentioned before, the shaft 74 is rotated by the rotary actuator 42 which includes DC stepping motor 96 and a harmonic drive device 98.

A brief description will be presented describing the components of the harmonic drive device.

The harmonic drive device 98 comprises three components, a circular spline 100, a wave generator 102, and a flexible spline 104. As shown in FIG. 3, the circular spline 100 comprises a round rigid thick wall 101 with internal spline teeth 103 and is secured to both the top wall 52 and the column 24 by appropriate means such as screws 106. The wave generator 102 is an elliptical ball-bearing assembly which functions as a rotating input drive element. The flexible spline member 104 is a non-rigid cylindrical thin wall cup 108 having, at one end (FIG. 2), an exterior surface provided with spline teeth 109 whose number is two less than the number of spline teeth 103 on the interior of the circular spline 100. The flexible spline 104 functions as an output drive element to drive the shaft 74.

As shown in FIG. 3, the driving contacts between the circular spline 100 and the flexible spline 104 are established 180° apart.

As more clearly shown in FIG. 2, the flexible spline 104 has the cup 108 provided with a closed end 110 secured to the shaft 74 by appropriate means such as screws 112. The wave generator 102 is secured by a keyway 114 on a shaft 116 of the stepping motor 96.

Figure 5:
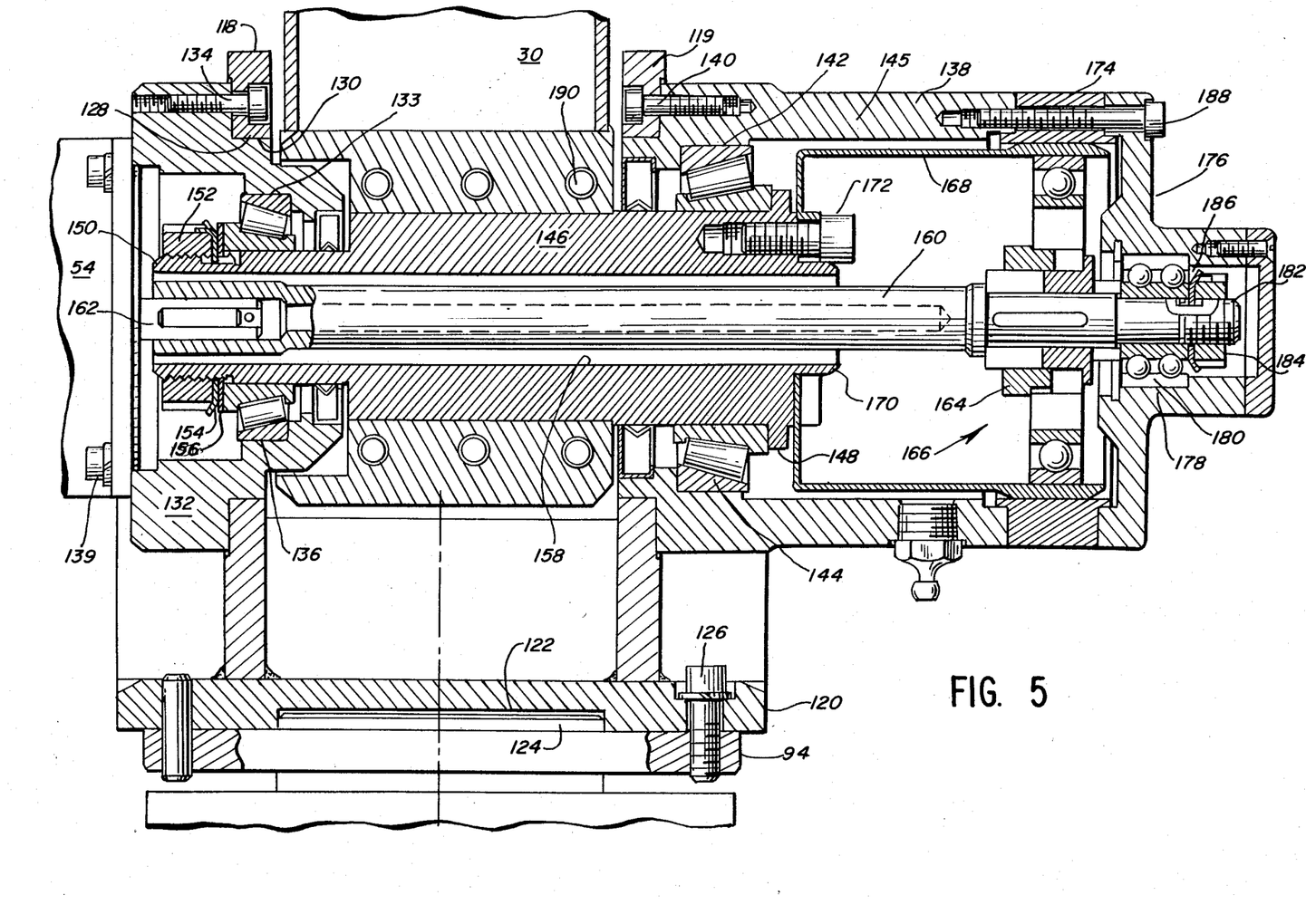
FIG. 5 is a sectional view through the trunnion assembly in conjunction with a rotary actuator which provides movement in a vertical plane to the manipulator arm.

The trunnion assembly 25, as shown in FIG. 4, as well as in FIG. 1, has a pair of arms 118 or 119 (FIG. 5) which are integrally formed with a base 120 which has a recess 122 adapted to receive a raised portion 124 on the platform 94. The trunnion assembly 25 is adapted to be secured to the platform 94 by appropriate means such as screws 126 best viewed in FIG. 5. Referring to FIG. 5, trunnion arm 118 has an opening 128 adapted to receive a circular portion 130 of a bearing mounting member 132 which is secured to the trunnion arm 118 by appropriate means such as screws 134 and also supports the stepping motor 54 by means of screws 139. The bearing mounting member 132 has a circular recess 133 for mounting and supporting a tapered roller bearing 136. The trunnion arm 119 supports a housing 138 by means of screws 140. The interior of the housing 138 is provided with a circular recess 142 for admitting and securing a tapered roller bearing 144. The two roller bearings 136 and 144 define a rotating bed for a power shaft 146 which preferably has a central portion square cross-sectional area as viewed in FIG. 4. The power shaft 146 has a flange 148 which is adapted to abut the roller bearing 144. To provide proper positioning of the power shaft 146 with respect to the roller bearing 136 and 144, to avoid transverse movement of the shaft 146 along its longitudinal axis, the power shaft 146 has an end 150 provided with a threaded portion supporting a lock nut 152 which, via a distance ring or spacer 154 and a washer 156, abuts the roller bearing 136.

The power shaft 146 is provided with a bore 158 through which passes a coupling shaft 160 which, at one end, is coupled to a shaft 162 of the stepping motor 54, and at the other end is coupled to a wave generator 164 of a harmonic drive device 166. A flexible spline member 168 of the harmonic drive device 166 is secured to an end 170 of the power shaft 146 by appropriate means such as screws 172. A circular spline 174 of the harmonic drive device 166 is interposed between the housing 138 and an end bell 176 having a recess 178 for admitting a roller bearing 180 which supports a reduced section 182 of the coupling shaft 160. The reduced section 182 is provided with a threaded portion for admitting a lock nut 184 which is adapted to abut, via a distance ring or spacer 186, the roller bearing 180. The end bell 176, including the circular spline 174, is secured by appropriate means, such as screws 188, to the housing 138.

Figure 6:
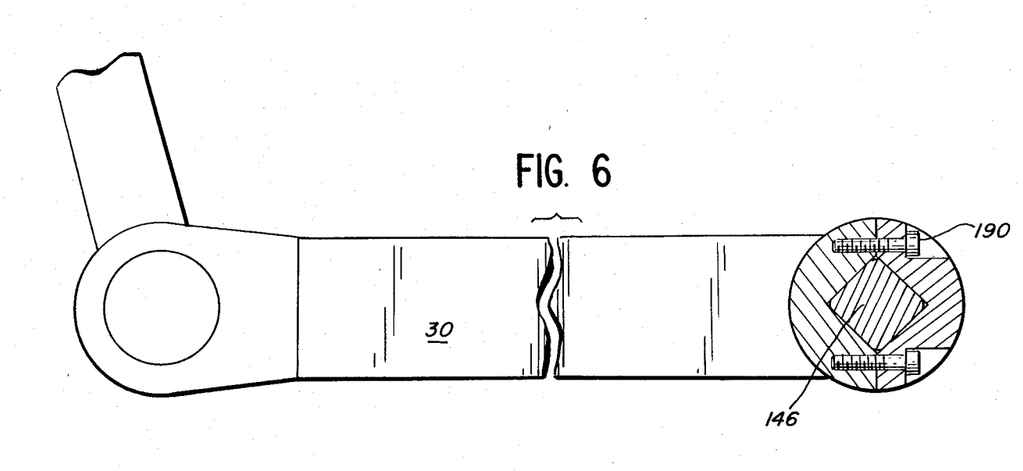
FIG. 6 is a sectional view of a portion of an upper arm section indicating the manner of attachment of the arm to a shaft having a square cross-sectional configuration and extending through the trunnion assembly.

As is apparent from FIG. 5, control signals which may be applied to the stepping motor 54 will cause rotation of the coupling shaft 160 which, in turn, will actuate the wave generator 164 which, in turn, will impart motion, on a reduced scale, to the flexible spline member 168 which, in turn, drives the power shaft 146 to impart motion to the upper arm section 30 secured to the power shaft 146 by means, such as screws 190. The manner of attachment of the arm 30 to the power shaft 146 is best viewed in FIGS. 5 and 6.

The other end of the upper arm section 30 terminates in a formed trunnion assembly 198 which has a pair of trunnion arms 200 for supporting the rotary actuator 32 comprising a stepping motor 202 and a harmonic drive device 204. The construction, arrangement and function of the stepping motor 202 and the harmonic drive device 204 is similar to that which was described in connection with the rotary actuator 26 comprising the stepping motor 54 and the harmonic drive device 166.

One end of the lower arm section 34 is secured and actuated by the rotary actuator 32. The other end of the lower arm section 34 supports the terminal motion actuator 38 which comprises a stepping motor 206, a harmonic drive device 208 and a terminal power unit 210 having an output shaft 222 supporting mounting means such as a platform 212 which is adapted to support and provide rotary motion to an article handling member such as a gripper 40. It should be understood that the mounting means 212 is capable of supporting any number of article handling members which are commercially available. Further, it should be stated that the terminal power unit 210, which is in the form of a stepping motor, is exemplary only, in as much as other types of power units, magnetic, electrical, pneumatic and others may be utilized for imparting motion to the article handling device.

Figures 8, 9:
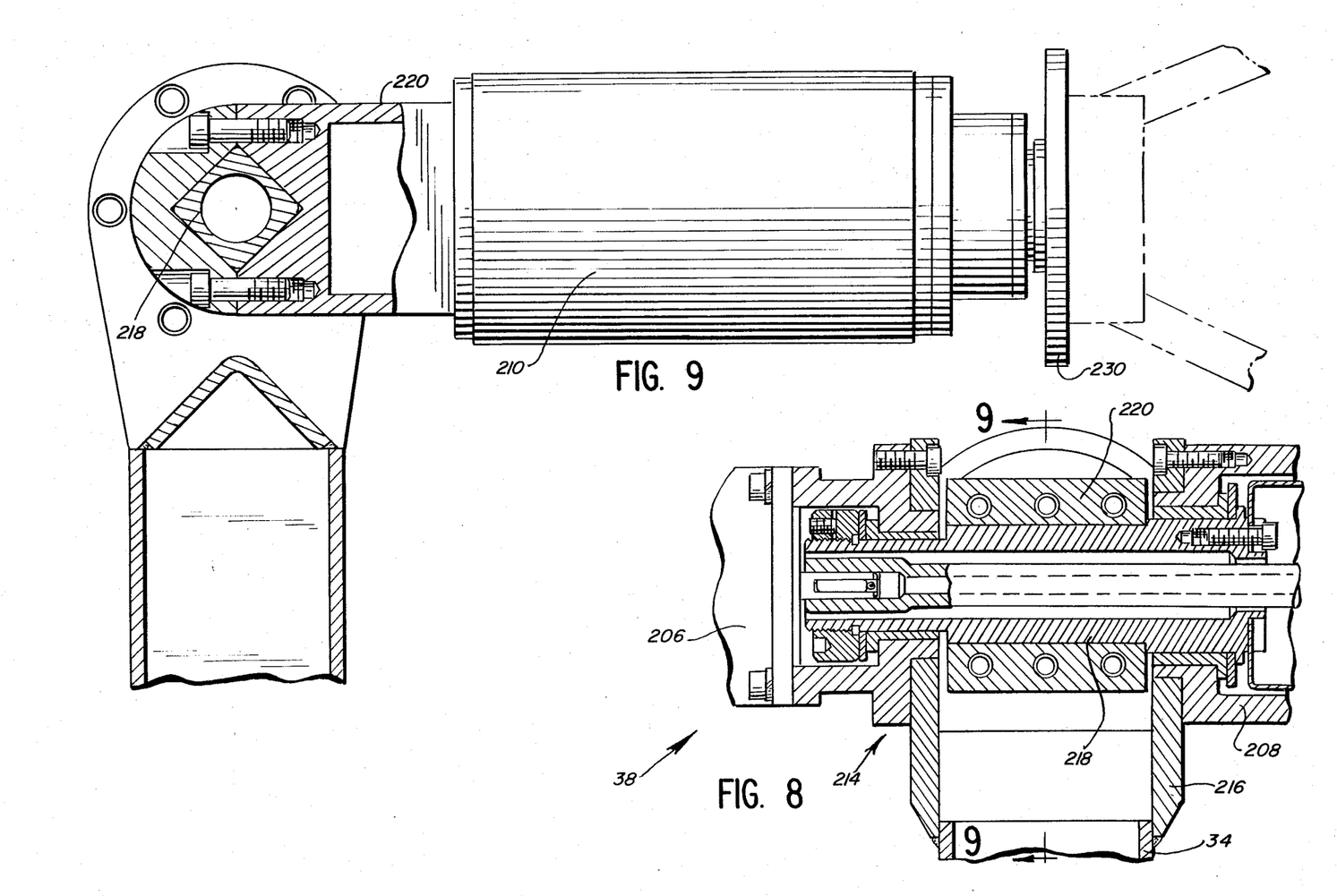
FIG. 8 is a partial sectional view through a motion actuator located at the extreme end of the manipulator arm.
FIG. 9 is a partial sectional view of the motion actuator, along the lines 9—9 of FIG. 8.
Figure 10:
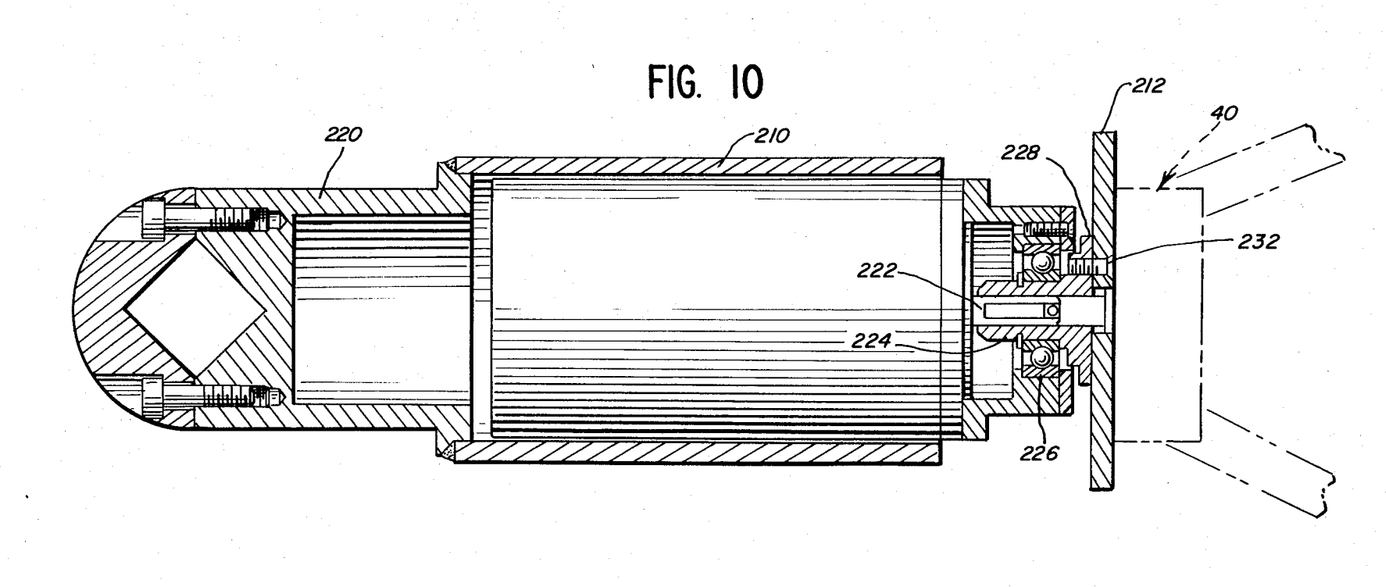
FIG. 10 is a partial sectional view of a terminal power unit which is adapted to support an article handling device such as a gripper.

The construction and arrangement of the components comprising the terminal motion actuator 38 can be more clearly viewed in FIGS. 8–10.

As shown particularly in FIG. 8, the lower arm section 34 terminates in a trunnion assembly 214 having a pair of trunnion arms 216. The trunnion arms 216 perform the function of supporting the stepping motor 206 and the harmonic drive device 208, as well as supporting a power shaft 218 to which is secured to a mounting member 220 which supports the stepping motor 210. It is not necessary to describe in detail the operation and functioning of the terminal motion actuator 38 since it performs in the same manner as was described in connection with the operation and functioning of the rotary actuators 26 and 32.

The stepping motor 210 has an output shaft 222 terminating in a shaft support member 224 which is supported by a roller bearing 226. The shaft support member 224 is provided with a flange 228 to which is secured the mounting means in the form of the platform 212 by means, such as screws 232. The platform 212 is used to support any type of a commercially available article handling member.

Referring particularly to FIG. 9, the stepping motor 210 and its attendant mounting member 220 function in the form of a wrist which is rotatable in the vertical plane by means of the power shaft 218. Control pulses applied to the stepping motor 210 will actuate the platform 212 and impart rotary motion thereto in planes parallel to the power shaft 218.

Figure 7:
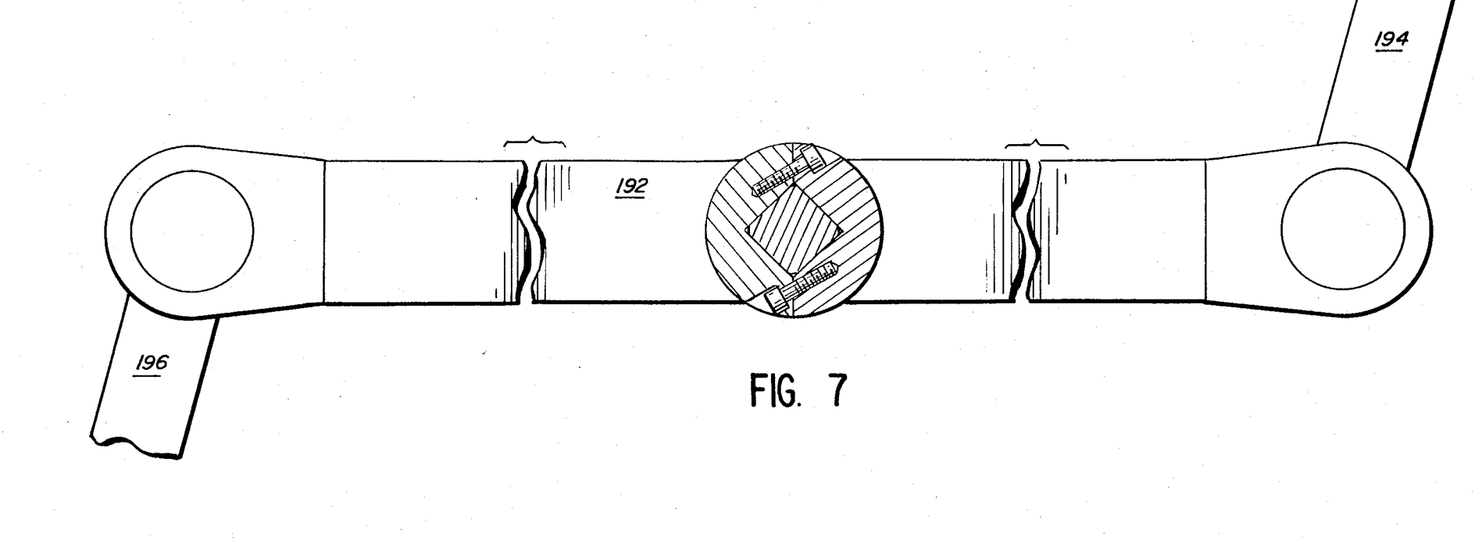
FIG. 7 is a modified form of an upper arm section having two opposed extremities, each of which is capable of supporting a lower arm section and a respective article handling member.

In certain manufacturing processes, the output of the manipulator apparatus 20 can be increased by replacing the upper arm section 30 with a modified dual-ended upper arm section 192, as shown in FIG. 7. Each of the ends of the upper arm section 192 would appropriately support lower arm sections 194 and 196 each of which, in turn, would be appropriately terminated in terminal motion actuator 38 and article handling member 40, as shown in FIG. 1.

For controlling the operation of the manipulator apparatus 20, reference is made to a block diagram shown in FIG. 11 which discloses a preferred control arrangment. All data inputs and outputs are controlled by a computer 240 which is an LSI-11 microprocessor which is a 16-bit microcomputer. The computer 240 is controlled by a control software commonly known as hardware 242 which basically controls the operation of the manipulator apparatus. It can be said that the hardware 242 defines the intelligence of the manipulator apparatus and includes a control program which is recorded on read-only memory chips (ROM), the recording being permanent. Connected to the computer 240 is a user-program or user software 244 which defines the description of the operation of the manipulator apparatus, as envisioned and programmed by an operator or user. The user program 244 is created by the user and is created automatically by the user moving the manipulator arm 28 through its trajectory and instructing the hardware 242 to memorize the circuit positions along the trajectory, as well as certain other operations. It is the hardware 242 which creates the user program in the memory of the computer 240. As the user guides the manipulator arm 28 through its trajectory during its operation, the user also instructs the computer by depressing appropriate push buttons to remember the positions of the manipulator arm. As the user continues to do so, the user program is created in the memory of the computer 240. The memory in the computer can be erased, changed or altered, as the user finds it necessary to modify its program. This operation is continued to the point where the user has in fact defined the operation that the manipulator arm is going to perform, wherein the manipulator arm will replay the user program. The user now instructs the manipulator apparatus to run, and does this by depressing an appropriate push button on an operator panel 246. At this time, the hardware 242 analyzes the user program 244 and takes out of the user program, an instruction, one instruction at a time, and performs an appropriate operation, the sum of such operations consisting largely of movements of the various portions of the manipulator arm.

A cassette unit 248 is used to hold the control program as developed in the user program 244. The purpose of the cassette unit 248 is to save the program, each cassette unit being associated with a different function or end purpose of the manipulator apparatus operation. If the cassette unit 248 is inserted into the opening 234 in the console 22 (FIG. 1), it is now possible to read the program from the cassette unit into the computer 240, and it would not be necessary to reprogram the manipulator apparatus to perform the same operation it has performed before.

The different positions of the various joints associated with the manipulator arm are visually displayed on a CRT screen 250 incorporated in the console 22. The screen also displays messages to the user about what is currently happening, as well as communicating error messages which indicate abnormal conditions in the operation of the manipulator arm. The screen 250 is helpful in guiding the user through a certain series of steps that are performed during the programming, and it is generally the only means of communication presented to the user. When the user depresses certain push buttons on the display panel, digital information is reflected on the screen.

The screen 250 is used in three basis phases of the manipulator apparatus operation. Phase I basically consists of the user creating the user program, wherein the user programs the manipulator apparatus by driving it through a sequence of steps that were mentioned before. That can also be identified as the input phase.

Then there follows Phase II, wherein the input is complete and, this is identified as a ROM phase, in which the manipulator apparatus is expected to spend the majority of its lifetime in, that is, the actual working phase when the user program is being executed and the control function is being performed. In this phase, the CRT screen 250 is used to reflect status information; it is used to reflect positional information; and it is used to display certain messages dealing with abnormal behavior, for example, moving one of the joints to a point where it is against one of the limits.

The Phase III operation is the editing phase during which the user can introduce a change into the program, such as including some other points that the user wants to include in the trajectory to smooth out the motion. The user uses the screen 250 and the operator panel 246 in a similar fashion, as during the original input, to modify the user program. Subsequently, when the program is modified, the user then typically enters the ROM phase again, having corrected the errors.

The information fed into the operator panel 246 is recognized and interpreted by the hardware 242, which then instructs the computer 240 to perform or take certain appropriate action.

The output of the computer 240 as well as input is coupled to bus means 252 which function to inter-couple the computer 240 to function generating means such as axes controlling devices identified as 254a–254f, external function generating means such as modular connector device 256 and data input means such as input component 258. In fact, the bus 252 can be accommodated to couple additional components to the computer 240. The bus 252 is used with an addressing system, wherein each of the components or devices 254a–254f, 256 and 258 has an individual address. Each of the devices 254a–254f is associated with a particular axis in the manipulator apparatus. Digressing for the moment to identify the different axes in the manipulator apparatus 20, referring particularly to FIG. 1, axis I relates to the rotational movement of the vertical shaft 74 in the vertical column 24, axis II relates to the movement caused by the rotary actuator 26, axis III is associated with the movement created by the rotary actuator 32, axis IV relates to the movement achieved with the terminal motion actuator 38, axis V relates to the movement achieved with the terminal power unit 210, and the final movement is associated with that achieved by the article handling member such as the gripper 40. For example, the axis controlling device 254b is associated with the rotary actuator 26 (axis II), the component 254b being capable of controlling the movement of a motor, such as 260b in a motor bank 260. It should be noted that the control exerted by the device 254b over the motor 260b is not direct, but via a microstep indexer 262b in a microstep indexer bank 262 and a motor driver 264b in a motor driver bank 264. Referring again specifically to the device 254b, its output is connected to a microstep indexer 262b which translates the command received from the device 254b into a series of discrete steps which energize eventually the respective motor 260b, which is a stepping motor. The property of the stepping motor is such that the rate at which the pulses are sent to the motor accurately reflect acceleration and deceleration. The microstep indexer, motor driver and stepping motor are of the type commonly used in the telephone art. Since the signals sent by the axis controlling device 254b to the microstep indexer 262b have inadequate electrical power to actuate directly the motor 260b, the output of the microstep indexer 262b feeds into the motor driver 264b, which amplifies the control signals to a level which is capable of energizing the stepping motor 260b.

Since there are present, six motors in the motor bank 260, the computer 240, with appropriate addresses, will instruct each of the axis controlling devices 254a–254f to perform their individual functions. Once the instructions are sent by the hardware 242 through the computer to the respective axis controlling devices, the hardware is relieved from the necessity of having to supervise the motor operations. It is immediately free to do other things. A consequence of this motor operation is that the computer can initiate a large series of concurrent movements, each performed concurrently by its respective axis controlling devices 254a–254f, in an unsupervised manner. The result of the foregoing operation is that the computer is capable of controlling a very large number of different operations because it does not have to supervise each and every operation.

Under some circumstances, one of the axis controlling devices, for example 254b, may interrupt the computer 240 to inform it that there is something wrong, and the movement cannot be completed, for example, as when the physical travel of the manipulator arm can no longer move because of some obstruction or the movement being out of the range of the arm. At this time, a message will be indicated on the screen 250 to alert the user or the operator.

The modulator connector device 256 has its individual address and functions to synchronize the operation of the manipulator apparatus 20 with external machinery around it. The control signal from the modular connector device 256 is coupled to a modular rack 266 which supports a plurality of modules 266a, 266b .... Basically, each module such as the module 266a is a switch which controls the operation of some external equipment or machinery connected or cooperating with the manipulator apparatus 20. Each module is provided with a light-emitting diode (LED) so that the operation of the module can be ascertained by the operator when a particular signal is transmitted from the operator panel 246.

Access to the computer 240 can also be accomplished through an external port 268 which permits a program to be fed directly into the user program 244 from some external device, which for example, may be a main computer (not shown) which supervises a large number of manipulator apparatus 20. The external port 268 has bi-directional characteristics so that information stored in user program 244 can be retrieved or sampled and fed back into the main computer for verification or identification purposes.

In the event that the manipulator apparatus 20 is subjected to a total power failure, or if the voltage drops to 90% of its normal value, the manipulator apparatus will immediately enter a power-fail state, and a special control signal will be sent by the hardware 242, which will stop the movement of the manipulator arm 28. When the power is lost, the DC power supply in the manipulator apparatus will be affected. However, there is an estimated 3-10 milliseconds for the manipulator apparatus to prepare itself for the stoppage. There is one additional element that comes into play, wherein the manipulator apparatus uses a starting circuit (not shown) which is very much like a motor starter, so that, when the power does come on again, the motor starter is de-energized and immediately, when the power is re-applied, it enters a power-up control hardware. In other words, the program is immediately restarted when the power is re-applied, but it is re-started in a start/stop state. It is not by any means executing any of the user programs.

As can be seen in FIG. 11, simplicity of control operation is achieved by using the bus 252 which functions to couple a large number of components or devices through a single cable 270, thereby avoiding centralizing all of the control functions in the computer 240 itself. Also, the bus 252 is instrumental in providing an arrangement wherein the computer 240 can initiate a large number of functions with appropriate instructions sent to the various components and devices so that these functions are carried out unsupervised. However, the computer is always kept informed of the completion of non-completion of its instruction, while the computer is free to do other things. In this manner, there has been provided an arrangement having a capacity to grow functionally and to actually grow in size and number of things that can be controlled. Of course, the hardware 242 has to be adequately advised for any increase obtained in the capacity. From the foregoing, it is apparent that many operations can be started by the computer and let the components or devices come back to the computer and inform the computer that the instructions have been carried out, thereby relieving the computer of further monitoring.

There will now be described the specific functions of the push-buttons 50 generally shown on the control panel 44 of the console 22 shown in FIG. 1. Reference is now made to FIG. 11.

The key switch on the operator panel 246 (FIG. 11) is used to turn on the manipulator apparatus 20. The large EMERGENCY STOP switch is used to turn the manipulator apparatus off. The CASSETTE UNIT is used for program storage. The RESET key is used to reset the manipulator apparatus and return it to its initial state. The HOME key, directly below the RESET key, is used to refer the manipulator apparatus to its home position and subsequently return all the axes to their home positions. The two rows of AXIS keys are used by the operator to jog or step the axis controlling devices 254 (FIG. 11) in the positive and negative directions. The 12-key NUMERIC PANEL is used to enter numeric data. The SAVE POSITION key is depressed by the operator to instruct the manipulator apparatus to remember a particular position along its trajectory. It is typically used after having advanced or jogged a particular axis to a desired position. The DELAY key directly below the SAVE POSITION key is used to program a specified length of delay in the operation of the manipulator apparatus. The duration of the delay is determined by depressing the correct key on the NUMERIC PANEL. The START LOOP key is used to program a start loop instruction in the manipulator apparatus' memory and that instruction is used to allow the programmer to specify that the manipulator apparatus should repeat a specific operation several times or perhaps infinitely. The END LOOP key is used to program the end of the loop instruction which corresponds to the start loop. The INPUT ON key is used by the operator to specify that the control program should wait for specific input to be turned on. The input is determined by depressing a particular key on the NUMERIC PANEL. The INPUT OFF key indicates that the program should be suspended until the specified input is brought to an operating state. The OUTPUT ON key is used by the operator to instruct the program to turn a particular output on. The OUTPUT OFF key has the reverse function in that it causes the instruction to the program to turn a particular output off.

Figure 12:
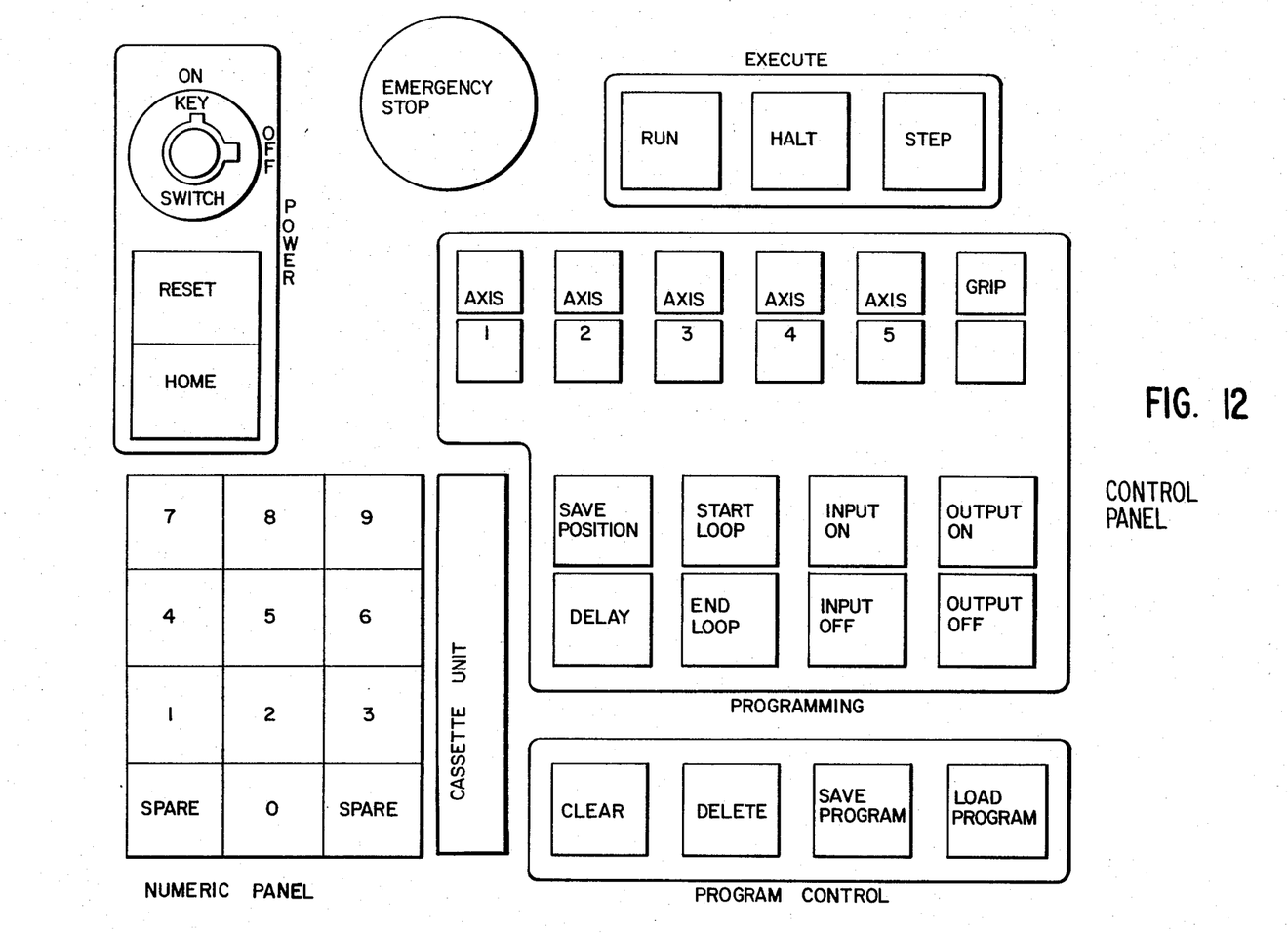
FIG. 12 shows a disposition of push buttons on an operator panel shown in FIG. 11.

The keys located in the lower right corner of the control panel control the execution of the program and other ancillary functions. The CLEAR key is used to clear any input that the operator had made, as shown on the CRT screen. The DELETE key is used to delete an instruction from the user program. The LOAD PROGRAM key is used to load the user program from a secondary cassette unit. The SAVE PROGRAM key is used to save the current program in the memory of the manipulator apparatus on the secondary cassette unit.

The RUN key is used to command the execution of the user program. The HALT key is used to suspend or halt the execution of the user program. Once the execution of the user program is halted, it can again be resumed by depressing the RUN key which commences the program from the same point at which it was halted. The STEP key is used for two purposes. It is used to step the user program in executing a loading by one step or it can be used to structure (step) the entire user program at slow speed. In an alternative operation, the STEP key can be used with the NUMERIC PANEL to instruct the manipulator apparatus to transfer control to a particular step in the user program. The two keys on the NUMERIC PANEL directly to the left and to the right of zero key can be used to add further functions to the NUMERIC PANEL.

Although a preferred embodiment of the invention has been described with some particularity, many modifications and variations in the invention are possible within the light of the above teachings. It is, therefore, to be understood that, within the scope of the appended claims, the inventions may be practiced other than as specifically described.

What is claimed is:

1. Manipulator apparatus comprising a plurality of elongated members serially interconnected by motion joints and defining a manipulator arm terminating in a terminal motion actuator having mounting means adapted to receive an article handling member, a motion actuator associated with each motion joint, each of said motion actuators having a power unit responsive to control pulses and a motion reducing unit for reducing the motion output of said power unit, the power unit and the motion reducing unit of each motion actuator being spaced from each other and mounted on opposite sides of the respective motion joint, means for demountably supporting said power and motion reducing units on said respective motion joint, and a movement coupling means for coupling together the respective power and motion reducing units, each of said power units comprising a DC stepping motor and each of said motion reducing units comprising a harmonic drive device, said terminal motion actuator having a terminal power unit responsive to control pulse for actuating said mounting means.

2. The device according to claim 1, wherein a first of said elongated members comprises a vertical hollow column, a base supporting said column, a vertical shaft housed within said column, a trunnion assembly secured to one end of said shaft, the other end of said vertical shaft being coupled to a flexible spline of one of said harmonic drive devices, a wave generator of the said harmonic drive devices being connected to one of said stepping motors, whereby said shaft, powered by the said harmonic drive device, provides motion in a horizontal plane to said remaining elongated members.

3. The device according to claim 2, wherein a second of said elongated members comprises an upper arm section having one end secured to said trunnion assembly and an associated motion actuator, said other end defining a trunnion assembly associated with a respective motion actuator for supporting one end of a third elongated member comprising a lower arm section, said lower arm section having its other end defining a final trunnion assembly associated with a respective motion actuator, and means for securing a terminal motion joint to said final trunnion assembly.

4. The device according to claim 2, wherein each hollow column is provided with a concentrically disposed recess defining a bed, a first tapered roller bearing supported by said bed, a second tapered roller bearing disposed above said first roller bearing, and means for adjustable positioning said roller bearings with respect to each other, said shaft having a shoulder abutting one of said roller bearings and being supported therefrom.

5. The device according to claim 2, said trunnion assembly comprising a pair of spaced trunnion arms, means for securing a respective power unit to one arm and the respective motion reducing unit to the other arm, a hollow power shaft supported between said arms, and a coupling shaft passing through said power shaft and coupling said power unit to said motion reducing unit, means for connecting said motion reducing unit to said power shaft, and means for connecting one end of said second elongated member to said power shaft, whereby the rotational movement of said power unit is reduced by said motion reducing unit and applied to said power shaft to rotate said second elongated member in a vertical plane.

6. The device according to claim 5, wherein the other end of said second elongated member terminates in a trunnion assembly, said trunnion assembly having a pair of spaced trunnion arms, means for securing a respective power unit to one arm and a respective motion reducing unit to the other arm, a hollow power shaft supported between said arms, a coupling shaft passing through said power shaft and coupling said power unit to said motion reducing unit, and means for securing one end of a third of said elongated members to said power shaft, whereby the rotational movement of said power unit is reduced by said motion reducing unit and applied to said power shaft to rotate said third elongated member in a vertical plane.

7. The device according to claim 6, wherein the other end of said third elongated member terminates in a trunnion assembly, said trunnion assembly having a pair of spaced trunnion arms, means for securing a respective power unit to one arm and a respective motion reducing unit to the other arm, a hollow power shaft supported between said arms, a coupling shaft passing through said power shaft and coupling said power unit to said motion reducing unit, and means for securing one end of said terminal power unit to said power shaft, whereby the rotational movement of said power unit is reduced by said motion reducing unit and applied to said power shaft to rotate said terminal power unit in a vertical plane.

8. A manipulator apparatus comprising a base means for rotatably supporting an upright elongated member on said base, an upper arm section, first means for rotatably supporting one end of said upper arm section on the end of said upright member, a lower arm section, second means for rotatably supporting one end of said lower arm section from the other end of said upper arm section, and third means, secured to the other end of said lower arm section, for rotatably and pivotally supporting a mounting means, said mounting means being adapted to support various article handling members, each of said first, second and third means comprising a trunnion assembly, a power unit mounted on one side of said trunnion assembly, a motion reducing unit mounted on the opposite side of said trunnion assembly, and coupling means passing through said trunnion assembly and coaxially coupling together said power and motion reducing units.

9. The device according to claim 8, wherein said rotatably and pivotally supporting means define a wrist section, means for rotatably supporting one end of said wrist section from the other end of said lower arm section, and means at the other end of said wrist section defining said mounting means.

10. Manipulator apparatus comprising a plurality of elongated members serially interconnected by motion joints and defining a manipulator arm teminating in a terminal motion actuator having mounting means adapted to receive an article handling member, a motion actuator associated with each motion joint, each of said motion actuators having a power unit responsive to control pulses and a motion reducing unit for reducing the motion output of said power unit, the power unit and the motion reducing unit of each motion actuator being spaced from each other across the respective motion joint, and a movement coupling means for coupling together the respective power and motion reducing units, each of said power units comprising a DC stepping motor and each of said motion reducing units comprising a harmonic drive device, said terminal motion actuator having a terminal power unit responsive to control pulses for actuating said mounting means, said trunnion assembly comprising a pair of spaced trunnion arms, means for securing a respective power unit to one arm and the respective motion reducing unit to the other arm, a hollow power shaft supported between said arms, and a coupling shaft passing through said power shaft and coupling said power unit to said motion reducing unit, means for connecting said motion reducing unit to said power shaft, and means for connecting one end of said second elongated member to said power shaft, whereby the rotational movement of said power unit is reduced by said motion reducing unit and applied to said power shaft to rotate said second elongated member in a vertical plane, wherein the other end of said second elongated member terminates in a trunnion assembly, said trunnion assembly having a pair of spaced trunnion arms, means for securing a respective power unit to one arm and a respective motion reducing unit to the other arm, a hollow power shaft supported between said arms, a coupling shaft passing through said power shaft and coupling said power unit to said motion reducing unit, and means for securing one end of a third of said elongated members to said power shaft, whereby the rotational movement of said power unit is reduced by said motion reducing unit and applied to said power shaft to rotate said third elongated member in a vertical plane, and wherein the other end of said third elongated member terminates in a trunnion assembly, said trunnion assembly having a pair of spaced trunnion arms, means for securing a respective power unit to one arm and a respective motion reducing unit to the other arm, a hollow power shaft supported between said arms, a coupling shaft passing through said power shaft and coupling said power unit to said motion reducing unit, and means for securing one end of said terminal power unit to said power shaft, whereby the rotational movement of said power unit is reduced by said motion reducing unit and applied to said power shaft to rotate said terminal power unit in a vertical plane.

* * * * *